UNITED STATES PATENT OFFICE.

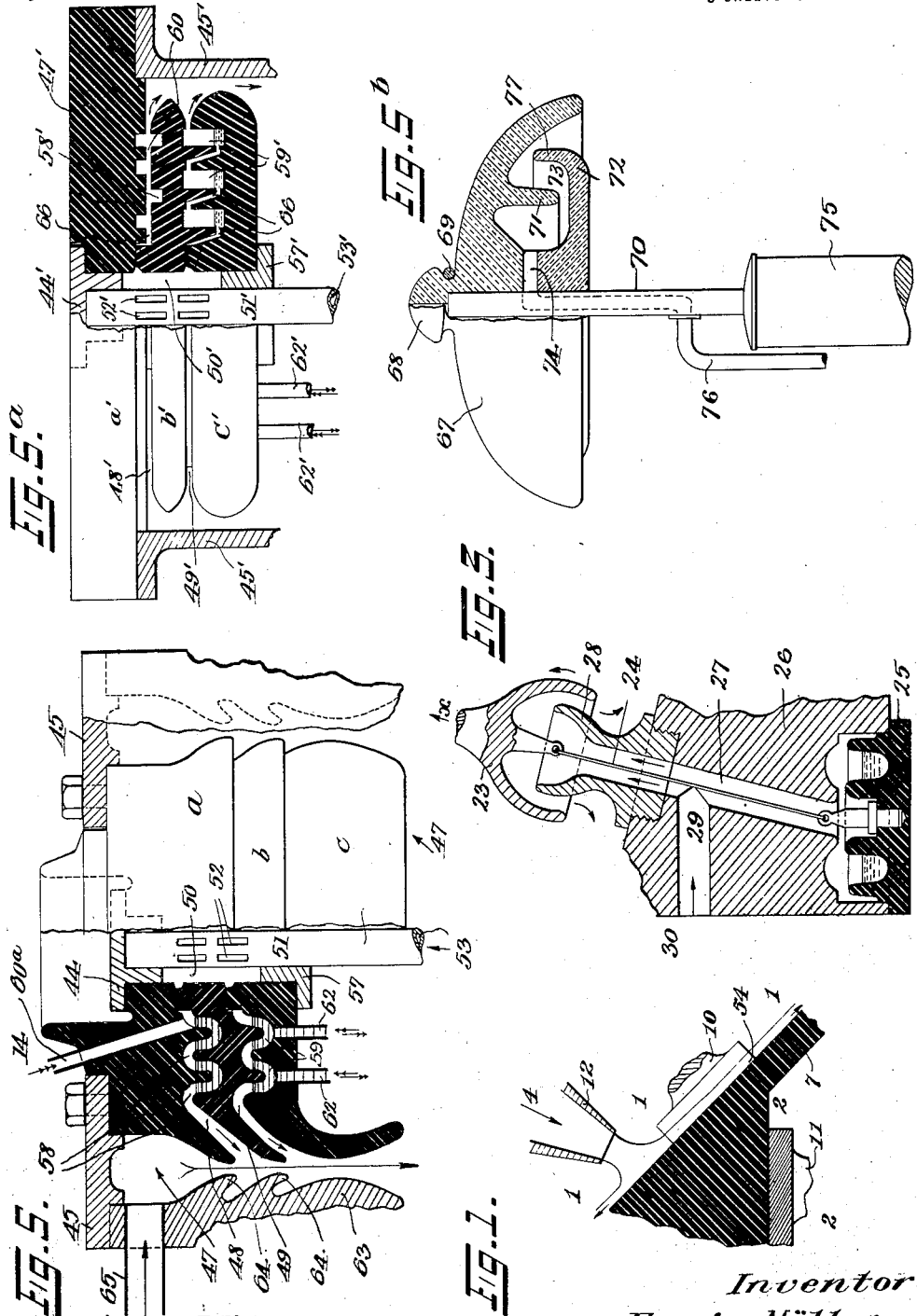

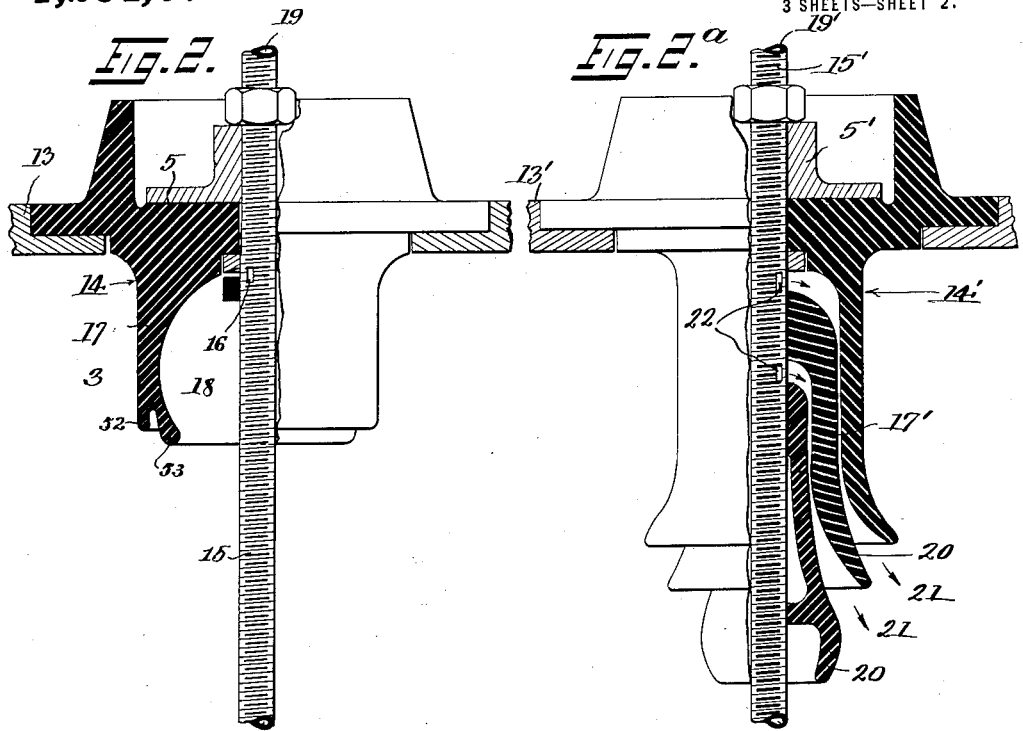
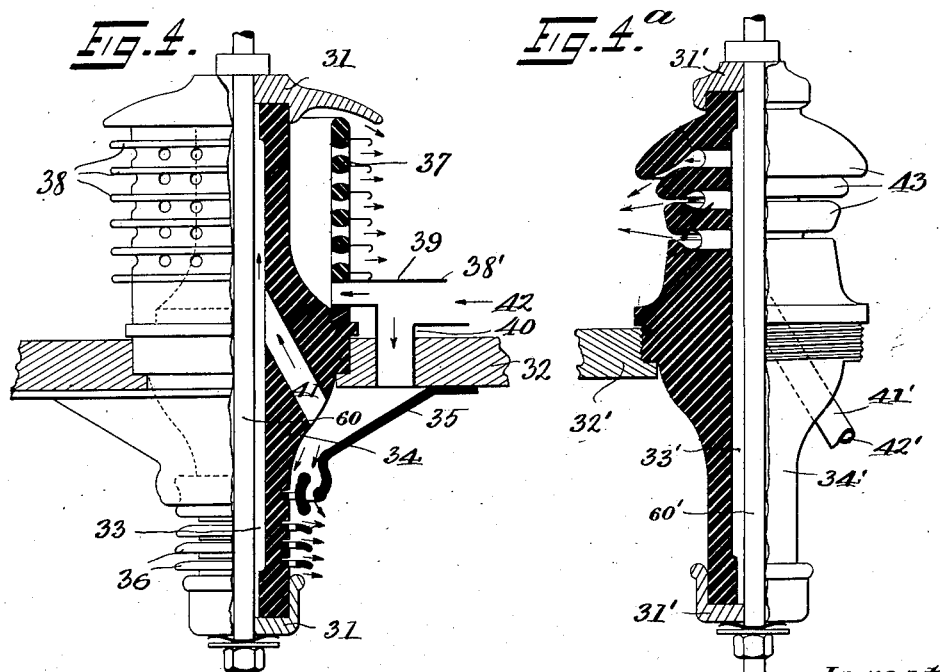

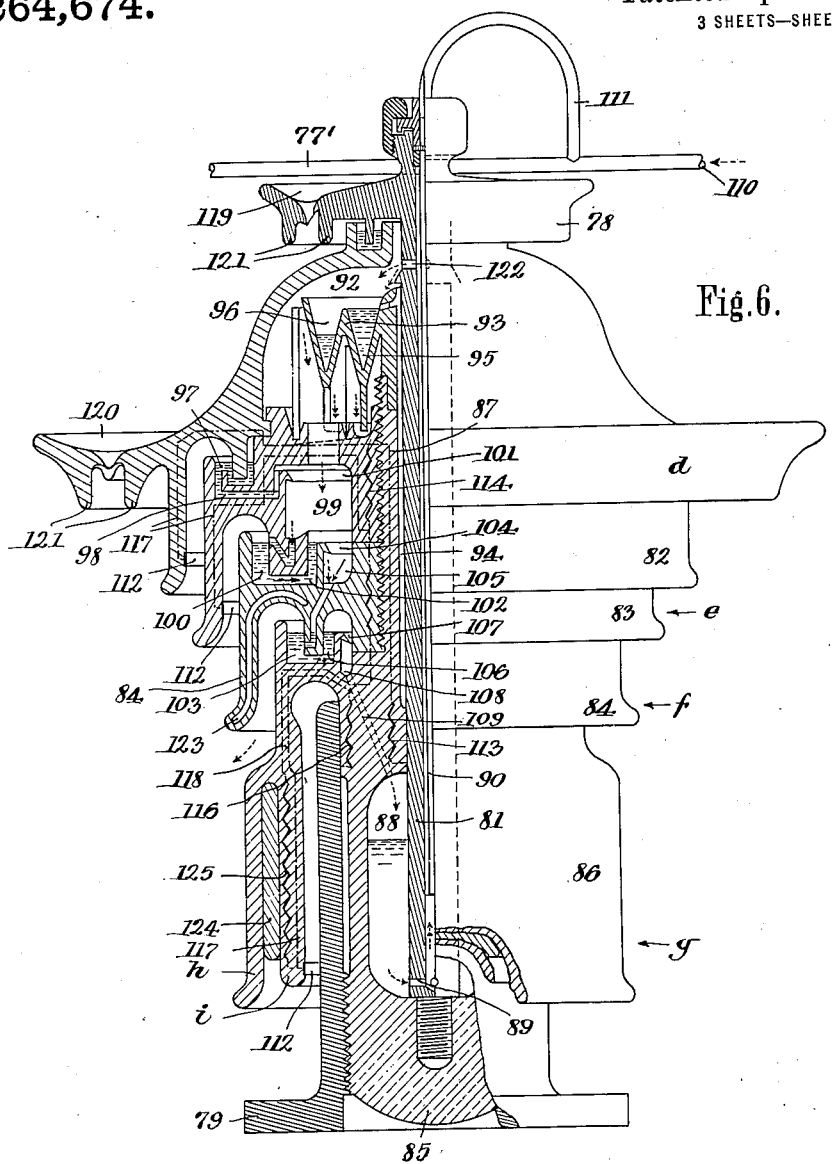

ERWIN MÖLLER, OF BRACKWEDE, GERMANY.

INSULATION OF ELECTRICITY.

1,264,674. Specification of Letters Patent. Patented Apr. 30, 1918.

Application filed August 10, 1909, Serial No. 512,142. Renewed October 17, 1917. Serial No. 197,174.

*To all whom it may concern:*

Be it known that I, ERWIN MÖLLER, engineer, a subject of the Kingdom of Prussia, German Empire, residing in Brackwede, Germany, Kupferhammer 59, have invented certain new and useful Improvements in Insulation of Electricity, of which the following is a specification.

This invention relates to an improved electrical insulation.

With the means heretofore available, it has been impossible to effectively prevent the leakage or escape of electricity under certain conditions, such for instance, where small quantities of electricity at relatively high tension were to be insulated on the surface of, or in chambers where conductive gases, vapors and the like, were likely to be present and collect. Where the surface of the insulating body employed was confined to a very small area, the inadequacy of the means heretofore available as insulation was still more pronounced, since, in such cases, the finely divided bodies, such as carbon dust, acid vapors and the like, suspended in the air or other media, which were caused by the electrical precipitation itself, would readily conduct the current and thus break down the insulation. Such conditions commonly arose when very high tension electricity was employed for stimulating the growth of useful plants in which very extended high tension systems supply only small quantities of electricity; when means were used for obtaining or measuring electricity in the higher layers of the atmosphere in which, as a rule, very small quantities of electricity at exceedingly high tension, came into consideration; or when means were used for measuring the ionization in moist air. When it was aimed to obtain or measure electricity in upper layers of the atmosphere, as aforementioned, a further difficulty was encountered in that the insulating devices were subjected to very great strains.

Among the main objects of the present invention, it is intended to provide means which will serve as adequate insulation under all the aforesaid extreme conditions.

Where high tension currents are conducted a great distance, the means heretofore available as insulation have been rather satisfactory. Under such circumstances, as compared to the results obtained by the insulating means heretofore employed, it is possible, by means of the present invention, to obtain a material rise in efficiency, an increase in the economical limits of the tension, and an increase in the economical limits of the distance of the transmitting energy.

A still further feature of the present invention is the use thereof as an adequate insulation when electricity at low tension is used, as, for instance, in electro-chemical or electro-metallurgical processes, in which heretofore it was entirely impossible to prevent, or only possible imperfectly to prevent, the admission of acid or metallic vapors, frequently combined with high heat, to the insulating devices.

As a rule, the several noxious influences aforementioned seldom occur independently one of the other but generally in combination with one or another of the other influences if not with all the other simultaneously. The present invention aims to provide means for effectively combating the several noxious influences either in combination with one or another of the other influences, or with all the others when they occur simultaneously with one another, as well as individually when they occur all alone, independent of one another. These means, their combinations, and their mode of employment, are hereinafter described.

These and other features, capabilities and advantages of the present improvement, will more fully appear from the subjoined detail description of one specific embodiment thereof, in which—

Figure 1 illustrates a fragmental view in section of a modification in which an arrangement is provided for use with an insulating fluid.

Fig. 2 illustrates a fragmental view, partly in section, of another modification similar to that shown in Fig. 1, in which, however, the surface on which the insulating fluid travels, is curved.

Fig. 2ª illustrates a fragmental view, partly in section, of still another modification similar to that shown in Fig. 2 in which, however, there are provided a plurality of curved passages through which the insulating fluid is guided.

Fig. 3 illustrates a fragmental view, partly in section, of a modification in which one of the conductors has a hood-formation to prevent the access of conductive material as well as to guide the insulating fluid.

Fig. 4 shows a fragmental view, partly in section, of a modification in which a shell surrounds the insulator proper, the shell having a plurality of passages therethrough from which insulating fluid is to be discharged, and which passages are provided with guards to deflect any incoming conductive substance.

Fig. 4ª shows a fragmental view, partly in section, of a modification showing the application of the invention to an arrangement in which a connection between two conductors extends through a wall from which the two conductors are to be insulated, by means of an arrangement having insulating fluid which may be discharged through a plurality of passages.

Fig. 5 shows a fragmental view, partly in section, of a modification similar to that shown in Figs. 2ª and 4ª, in which, however, the discharge passages of the insulating fluid are equipped with sealing chambers.

Fig. 5ª shows a fragmental view, partly in section, of a modification similar to that shown in Fig. 5 in which another form of sealing chamber is provided.

Fig. 5ᵇ shows a fragmental view, partly in section, of an arrangement in which a non-conducting fluid may be conveniently pumped to the fluid insulator of a pole adapted for aerial lines.

Fig. 6 shows a fragmental view, partly in section, of an arrangement in which an insulating fluid is used, as well as sealing chambers, through which such insulating fluid is passed, and in addition thereto, heating means.

The several distinct means which act individually and in combination to adequately effect insulation by the present invention are: A moving non-conducting fluid actuated across a surface to be insulated; sealing chambers disposed in the passages through which the moving non-conducting fluid is discharged and thereby to prevent the passage of a current through such passages in the event the moving non-conducting fluid is not effective; filtering means through which the fluid for the sealing chambers is passed to filter out any conductive or other injurious substance; a jet of fluid actuated between the points where the electrical contacting bridge is about to be formed; insulatory heating means whereby the injurious effects of heat and cold on an insulating system may be prevented; current discharging means, such as a Faraday-Thomson chamber for deënergizing drops of water and the like; and potential regulating means.

In the embodiment shown in Fig. 1, there is illustrated a conductor 11 secured to the lower horizontal surface of an insulator 7, which insulator has an inclined surface on which a conductor 10 is disposed. The atmosphere disposed below the insulator 7 and about the conductor 11 is designated as 2, while the atmosphere disposed above the upper inclined surface of the insulator 7 and about the conductor 10 is designated as 1. If the atmospheres 1 and 2 were in communication with one another and the finely sub-divided conductive bodies, such as acid vapors, carbon dust, and the like, were suspended in such atmospheres, a condition would be presented in which the current could readily be conducted through such conductive bodies from one conductor to the other. To prevent such conduction, a nozzle 12 is provided which is directed toward the surface 54 of the insulator 7 and through which a non-conductive fluid 4 is discharged onto the surface 54 so that it will flow all around the conductor 10 thereby effectually interrupting the continuity of any conductive medium that might be formed by the sub-divided bodies suspended in the atmospheres 1 and 2 between the conductors 10 and 11.

In the embodiment shown in Fig. 2, a conductor 5 is secured to a wall 13 of conductive material and separated therefrom by an insulator 14. The binding rod 15, which secures the conductor 5 to the insulator 14, is a tubular member through which is conveyed a non-conductive fluid 19 similar to the fluid 4 used with the embodiment illustrated in Fig. 1. Projecting downwardly around the tubular member 15, the insulator 14 is provided with an annular member 17, the inner surface 18 of which is concave, the downwardly projecting curved concave surface being unsuited to the ready settling thereon of conductive substances. The tubular member 15 inside of the annular member 17 is provided with openings 16 through which the fluid 19 discharges onto the concave surface 18 of the annular member 17 and thus, the binding rod or tubular member 15 being of conductive material and in contact with the conductor 5, the liability of noxious substances in the atmosphere 3 disposed between the wall 13 and the member 15 settling and forming a conductive layer on the insulator 14 is prevented. At the lower portion of the annular member 17, two concentric rims 52 and 53 are formed which are conductively connected with the conductor 5 by means not shown.

The embodiment shown in Fig. 2ª, similar to the embodiment shown in Fig. 2, comprises a conductor 5' secured to a wall 13' of conductive material and separated therefrom by an insulator 14'. The binding rod 15', which secures the conductor 5' to the insulator 14', is a member through which is conveyed a non-conductive fluid 19'. Projecting downwardly around the tubular member 15' the insulator 14' is provided with a downwardly projecting annular bell-shaped member 17' inside of which, and concentric thereto, a plurality of bell-shaped members 20 are disposed, all of which bell-shaped members are spaced from one another to form guiding passages 21 from the openings 22 in the tubular member 15' by means of which the fluid 19' issuing from the openings 22 is guided in its outward passage. This arrangement, in addition to preventing the formation of a conductive surface, serves to sub-divide the fall in the potential.

In the embodiment shown in Fig. 3, a device adapted to take up a pull in the direction of the arrow $x$ is shown as comprising a conductor 23 of bell-shaped construction and connected by a draw-bar 24 to an insulator 25. The insulator 25 is secured to a conductor 26 from which the conductor 23 is to be insulated, the conductor 26 being provided with a bore 27 through which the draw-bar 24 extends. At the end of the bore 27, adjacent to the conductor 23, there is provided a cup-shaped member 28 which extends into the bell-shaped conductor 23 and coöperates therewith to prevent the admission of coarser conductive bodies. Disposed in the conductor 26, and in communication with the bore 27, there is formed a second bore 29 by means of which an insulating fluid 30 is conveyed to the bore 27, which fluid passes through such bore in the direction of the arrows, thereby preventing the collection of conductive substances on the surface of said bore 27 and furthermore discharging from the conductor 23 to further insulate the surfaces of both the conductors 23 and 24. On account of the insulating effect produced by the coöperation of the bell-shaped conductor 23 with the cup-shaped member 28 to prevent the admission of coarser conductive substances, it is obvious that the effect required to be produced by the insulating fluid 30 need only be sufficient to prevent the accumulation of the finer conductive substances.

In the embodiments shown in Fig. 4, a device is provided having two conductors 31 disposed on opposite sides of the wall 32 and connected to one another by the rod 60, which conductors 31 are to be insulated from the wall 32. The rod 60 passes through a bore 33 in the insulator 34, which extends through the wall 32. The wall 32 is provided with a cup-shaped member 35, which extends around the body of the insulator 34 adjacent to the wall 32 and forms a chamber therewith. Below the cup-shaped member 35 there are arranged around the insulator 34, a plurality of annular members 36 which have openings in them adjacent to the insulator 34 that are in communication with the chamber formed by the cup-shaped member 35. The upper portion of the insulator 34 is constricted, and around such constricted portion there is disposed a perforated casing 37 spaced apart therefrom to form a chamber, one of the conductors 31 forming the roof for such chamber. Secured to the casing 37 there are a plurality of annular guards 38 preferably of conductive material and having downwardly and inwardly curved flanges at their free ends, such guards being spaced from one another and having disposed between them rows of perforations so that the guards might serve as guides for the substance issuing from such perforations. The upper conductor 31 furthermore laps over and beyond the outer peripheries of said guards and thereby serves as a protection to prevent the admission into the chamber in said casing 37 of coarser conductive substances. For conveying non-conductive insulating fluid 42 into the chamber in said casing 37 and into the chamber in the cup-shaped member 35, a conduit 38' is provided which has a branchway 39 extending through such casing 37 and into the chamber therein, and also a branchway 40 which extends through the wall 32 and into the chamber in such cup-shaped member 35. In communication with the chamber in said cup-shaped member 35 there is a bore 41 extending through said insulator 34 and extending to the bore 33. From the foregoing, it will be seen that when the insulating fluid 42 is fed into the conduit 38', it will be passed into the chamber formed inside of the casing 37 and discharged through the perforations thereof, and also pass into the chamber inside of said cup-shaped member 35 and from there into the bore 33 and in addition thereto discharge from between the annular members 36 thereby preventing the collection of a continuous layer of conductive substances between the conductors 31 and the wall 32.

The embodiment shown in Fig. 4ª is similar to the embodiment shown in Fig. 4, and comprises two conductors 31' which are disposed on opposite sides of the wall 32' and connected by a rod 60' which passes through a bore 33' in the insulator 34', which insulator 34' extends through the wall 32'. Between the insulator 34' and the upper conductor 31', there are formed a plurality of insulating disk members 43 which are spaced from one another and from the rod 60' to form communications extending between such disk members 43 from the bore 33'. The upper disk members 43 extend beyond the outer peripheries of those below them to prevent the admission of coarser conductive substances to the bore 33'. In the insulator 34' and extending through the same, there is disposed a conduit 41' in communication with the bore 33' by means of which conduit 41' insulating fluid 42' may be conveyed to the bore 33' from which it can discharge through the spaces formed between the disks 43 and the insulator 34' thereby preventing the accumulation of conductive substances in the bore 33' as well as to prevent the accumulation of a continuous layer of conductive substances between the conductor 31' and the wall 32'.

In the embodiment shown in Fig. 5, there is provided a conductor 44 disposed centrally of the conductor 45. The conductor 44 is secured to the center of the upper section $a$ of the insulator 47, which extends through and is secured to the inner periphery of the conductor 45. The insulator 47, in the present instance, comprises the aforesaid section $a$ and the sections $b$ and $c$, which are disposed one below the other and form passages 48 and 49 between them. The sections $a$, $b$ and $c$, are provided with openings concentric with one another to form the bore 50 through which extends the tubular member 51 secured, in the present instance, to the conductor 44; the tubular member 51 being provided with openings 52 to permit the passage of the non-conductive insulating fluid 53 passing through said tubular member 51 into said bore 50. Secured to the lower section $c$ of the insulator 47 there is formed a collar member 57 which closes the lower end of the bore 50. The passages 48 and 49 are wavelike in conformation to form sealing chambers having the pockets 58 and 59 into which the sealing fluid is fed, preferably composed of a non-conductive liquid of a heavier specific gravity than that of the non-conductive fluid 53. This non-conductive liquid is fed to the pockets 58 by means of the passage 60$^a$ formed through the section $a$ and fed to the pockets 59 by means of the passages 62. In operation, when the sealing liquid is disposed in the pockets 58 and 59 and the non-conductive insulating fluid is being fed through the tubular member 51, it will pass into the bore 50 and from there through the openings 52 to the pockets 58 and 59 and will have sufficient force to pass through the sealing liquid disposed in such pockets 58 and 59. From the foregoing, it will be seen that here again insulation is obtained in preventing accumulation of conductive substances inside of the insulator proper and in preventing the formation of a continuous layer of conductive substances between the conductors 44 and 45 by means of a moving non-conductive fluid. When this fluid 53 is out of operation or comes to rest, it will be seen that the sealing liquid in the pockets 58 and 59 will prevent the passage therethrough of an electric current. It is further to be noticed that the continuous passage of the non-conductive fluid through the sealing liquid will operate to carry therefrom any conductive substances that might be collected in the sealing liquid.

In order to prevent the formation of electrical conductive bridges between two spaced-apart portions of an insulating device, the embodiment shown in Fig. 5 is provided with a casing 63 inclosing the sections $a$, $b$ and $c$, which casing 63 is provided with annular rims 64 each disposed adjacent to one of the free annular edges of the sections $a$, $b$ and $c$.

This casing 63 is secured to the conductor 45 and is provided with a passage 65 through which a fluid is fed, which passes the outer annular edges of the sections $a$, $b$ and $c$, thereby breaking up any bridges that might have been formed between such edges, and furthermore causing a suction by means of which it will assist the fluid 53 in discharging.

The embodiment shown in Fig. 5$^a$ is similar to that shown in Fig. 5 and comprises a conductor 44' disposed in the center of the upper section $a'$ of the insulator 47' which is disposed on and secured to the conductor 45' from which the conductor 44' is to be insulated. The insulator 47' comprises in addition to the aforesaid section $a'$, the sections $b'$ and $c'$ disposed below one another and forming between them the passages 48' and 49'. The sections $a'$, $b'$ and $c'$, are provided with concentric openings forming the bore 50' through which extends the tubular member 51' having openings 52' in communication with the bore 50'. Secured to the lower section $c'$, and at the center thereof, there is formed a collar 57' which closes the lower end of the bore 50'.

The passages 48' and 49' comprise enlarged annular channels 58' and 59' connected with one another by the narrow passages 66, the enlarged annular channels 59' of the lower passage 49' forming sealing pockets to which a sealing liquid is supplied by the conduits 62'. The operation of the embodiment shown in Fig. 5$^a$ is somewhat similar to that shown in Fig. 5 and consists essentially in the feeding of non-conductive insulating fluid 53' through the tubular member 51' and which it discharges through the openings 52' into the bore 50' and from there passes through the passages 48' and 49' through the sealing liquid disposed in the sealing pockets 59', the sealing liquid serving to prevent the discharge therethrough of an electrical current or the admission thereto of objectionable substances when the insulating fluid 53' is inactive or out of operation.

In the embodiment shown in Fig. 5<sup>b</sup>, there is illustrated an insulator for use on a pole adapted for aerial lines, and comprises a bell-shaped insulating member 67 having a supporting projection 68 formed on its upper end around which the conductor 69 passes. The bell-shaped member 67 is provided with a central bore into which extends the tubular member 70. The inner surface of the insulating member 67 is provided with an annular downwardly extending projection 71 having annular channels on each side of it. Around the tubular member 70, adjacent to the bell-shaped member 67, there is arranged a second insulating member 72 which has an annular recess 73 in its upper surface into which the annular projection 71 extends, and also has an annular upwardly extending flange 77 at its periphery which extends into the annular channel formed around the outside of the annular projection 71. Between the members 67 and 72, a passage 74 is provided in communication with the tubular member 70. The tubular member 70 is connected to a reservoir 75 adapted to contain a non-conductive liquid, and has passed through it a small pipe connection 76 connected to a pump (not shown) by means of which the non-conductive liquid contained in the reservoir 75 is pumped up into the annular channel 73 to form a sealing chamber whereby to prevent the admission of objectionable substances or else to discharge out from between the members 67 and 72 to prevent the formation of an electrical conducting bridge or the like.

In the embodiment shown in Fig. 6, there is provided a tubular conducting member 77' to be attached to the upper insulating crown member 78 and to be insulated from the conductive member 79 in which the downwardly extending portion 85 of the insulating section $g$ is secured, the insulating crown member 78 having downwardly extending from the center of its lower surface a cylindrical portion 81 which extends down into the portion 85 of the insulating section $g$.

Below the insulating member 78 is disposed an upper bell-shaped section $d$ having a downwardly extending annular projection 82 inwardly of the outer periphery of the upper section $d$. Inside of the section $d$, and by which the section $d$ is supported, there is disposed a section $e$ having a downwardly extending annular projection 83 disposed inwardly of the projection 82. Inside of the section $e$ there is disposed a section $f$ having a downwardly extending annular projection 84 disposed inwardly of the projection 83. Inside of the section $f$ there is disposed the section $g$ which is provided with the portion 85, the section $g$ having inwardly of the projection 84 a downwardly extending annular projection 86 and also an inner upwardly extending tubular portion 87 on which the sections $e$ and $f$ are secured.

Inside of the downwardly extending portion 85 of the section $g$, there is formed a reservoir for non-conductive oil or the like. At the lower end of the cylindrical portion 81 there is formed an opening 89 in communication with the reservoir 88, and this opening 89 is in communication with the bore 90 extending through the cylindrical portion 81. The portion 81 is provided with another opening which forms a communication between the bore 90 and a second bore 94 formed in the section $g$, which extends upwardly and communicates with the chamber 92 formed by the sections $d$ and $e$.

In this chamber 92, and secured to the cylindrical portion 81, there is disposed an annular filtering member 93 having two troughs 95 and 96 for containing non-conductive oil or the like. From the filtering member 93, the filtered oil is fed by suitable conduits (not shown) to the annular sealing chamber 97 formed by the coöperation of the sections $d$ and $e$. The sealing chamber 97 is provided with a conduit 98 which leads to the chamber 99 and permits oil to discharge into the sealing chamber 100 formed by the coöperation of the sections $e$ and $f$, by dropping from the annular flange 101 formed at the outlet of the conduit 98 so as to prevent the oil from flowing along the lateral wall of the chamber 99. The sealing chamber 100 in turn is provided with a conduit 102 by means of which the oil may be conducted to the sealing chamber 103 below the chamber 105 and likewise by dropping from the annular flange 104 formed at the outlet of the conduit 102. The sealing chamber 103 is provided with a conduit 106 by means of which the oil is permitted to be conducted over the annular flange 107 at the outlet of the conduit 106 into the chamber 108, which oil, by means of the conduit 109, is returned to the reservoir 88. The oil of the reservoir 88 is pumped up by means of the non-conductive fluid 110, which is preferably of a lighter specific gravity than the oil in the reservoir 88, which fluid 110 is fed through the conduit 77' into the pipe connection 111, which extends down through the cylindrical portion 81 into the reservoir 88 thereby acting as a gas-lift pump to pump up the oil contained in said reservoir 88. The pipe connection 111 also communicates with the chamber 92 by means of the passage 122 extending through the cylindrical portion 81.

The fluid 110 will, from the chamber 92, pass to the several sealing chambers and force through them out between the passages formed between the downwardly extending projections 82, 83, 84, and section $g$, to prevent the accumulation of non-conductive substances as already explained.

In the dropping places, where the oil drips from the outlet of one sealing chamber to the next chamber, it will be seen that only the fluid 110 will come into contact with the walls of the chambers in which such dropping takes place, and thus, even though the oil were so contaminated as to conduct a current, there would be sufficient interruptions to prevent the formation of a continuous conductive layer.

The projections 82, 83 and 86 are provided with annular conducting strips 112 which are connected by suitable conductors 117 with the resistances 113, 114, and 116. The resistances 113, 114 and 116, may be connected with any suitable source of current (not shown).

For further protecting the insulation aforesaid, a heating system is provided to form choke points. By employing heat means, the surfaces are heated and thereby the foreign bodies on such surfaces are vibrated and consequently the electrical resistance of such parts is increased. The aforesaid "choke-points" are preferably arranged in constrictions or cavities of the insulator where they are substantially withdrawn from the cooling action of the surrounding space, such as the wind, a conducting surface or the like. The heating system illustrated in Fig. 6 consists essentially of the resistance 114, which, together with the resistance 113, heats the tubular member 81 through which the fluid 110 passes thereby heating such fluid 110 and also heating the tubular extension 87 through which the oil passes on its way to the sealing chamber, thereby heating such oil, which fluid 110 and oil in turn heat the filtering member 93. As the heated fluid 110 passes through the sealing chamber 100, it will further heat the oil in such sealing chamber and absorb moisture and such like conductive substances contained in the oil. By means of the chamber 123 formed in the projection 84, in which chamber a vacuum may be created, or the same filled up with hydrogen or the like, the sealing chamber 100 is protected from its lower side against loss of heat.

In the projection 86, another form of heating means is illustrated, the projection 86 comprising two downwardly extending portions $h$ and $i$. Between these projections $h$ and $i$, a heat insulating means 124 is inserted, and in the portion $i$ an electrical heating resistance 125 is disposed, which is connected by a conductor 118 with the resistance 114.

For deënergizing drops of water as they drop from the insulator, the crown member 78 and the section $d$ are provided with annular depressions 119 and 120 near their outer peripheries. In these depressions 119 and 120, perforations are formed to permit the water that flows into such depressions to drop therethrough drop by drop. On the outer and inner sides of these rows of perforations, along the lower surfaces of the crown member 78 and the section $d$, there are formed annular rims 121, which are electrically connected with one another for withdrawing any charge that the drops might possess.

It is obvious that various changes and modifications may be made to the details of construction without departing from the general spirit or scope of the present invention.

Having thus described my invention, I claim:

1. In an insulator for electricity, the combination of an insulator body having a plurality of hoods, of a reservoir in the interior of said insulator, a plurality of ducts connecting the said reservoir with the surfaces of said hoods, an insulating fluid in said reservoir, and means for causing streams of insulating fluid to flow from said reservoir through said ducts.

2. In a system of electric insulation, the combination of insulator bodies, a fluid reservoir arranged therein, interiorly arranged fluid conducting ducts in connection with said reservoir for conducting fluid from said reservoir to the outer surfaces of said insulator bodies, and means for constantly circulating fluid from said reservoir to said insulator bodies.

3. In a system of electric insulation, the combination of insulator bodies having interiorly arranged fluid reservoirs therein, fluid guiding means in said bodies for guiding fluid from said fluid reservoirs to the outer surfaces of said insulator bodies, and circulating means for circulating the fluid from said guiding means to said insulator bodies.

4. In a system of electric insulation, the combination with an insulator body, of a reservoir interiorly arranged in said body, interiorly arranged fluid conducting ducts in connection with said reservoir, means for circulating insulating fluids through said ducts from said reservoir and substantially annular discharge ports in communication with said ducts for directing the circulating fluid discharged from said ducts in hood-like formation.

5. In a system of electric insulation, an insulator body having interiorly arranged fluid conducting ducts, a fluid reservoir connected to said ducts, and means for circulating insulating fluids from said reservoir through said ducts, the body having substantially annular discharge ports for directing the moving insulating fluid discharged from said ducts in circular formation, said annular fluid discharge ports being constricted in relation to the volume of insulator fluid supplied thereto.

6. A system of electric insulation comprising an insulating body having sealing chambers therein, there being discharging ports for said sealing chambers, a conduit for conveying sealing fluid to such sealing chambers, said sealing fluid forming seals to prevent the admission of objectionable matter to such system through such sealing chambers, and a conduit for conveying non-conductive insulating fluid through said chambers and out through said ports.

7. In a system of electric insulation, an insulator body arranged to receive and conduct two insulating fluids of different densities, there being chambers formed in said insulating body, the denser of the said fluids being disposed in said chambers to form seals to prevent the admission of objectionable matter to such system, the lighter of the said fluids being a medium for absorbing conductive matter, and means for causing the passage of the denser fluid through said denser fluid for the purpose of absorbing objectionable conductive matter carried by said lighter fluid.

8. In electric insulating bodies, an insulator having a plurality of superimposed hood members, the same having annular fluid channels arranged therein and having downwardly depending annular baffle members integral thereon, fluid disposed in said channels, the baffle members of the upper hoods so arranged as to extend down into the fluid channel in its adjacent hood member and below the normal level of said fluid, a fluid reservoir, insulating fluid in said reservoir, ports leading from said reservoir to the highest fluid channel, ports leading from each fluid channel successively back to said reservoir, means for causing said insulating fluid to circulate as described, chambers formed in said insulator and sealed by said circulating insulating fluid, and heater means arranged in the interior of said insulator so as to heat said chambers.

9. In a system of electric insulation, an insulator, conductors carried thereby, a support for the insulator, an insulator fluid circulating in said insulator, there being ducts formed in said insulator to permit said insulator fluid to flow across the outer surfaces of said insulator, and means for causing streams of insulator fluid to flow across the outer surfaces of said insulator.

10. In an electric insulator, the combination of a plurality of insulating bodies connected together and a conduit passing continuously through all said bodies and provided with openings in communication with the outer surfaces of said bodies for supplying insulating fluid mediums to the outer surfaces of said bodies.

11. In a system for electric insulation, an insulator comprising a plurality of insulator bodies spaced apart, fluid conducting means, means for circulating insulating fluid through said conducting means to the insulator bodies, and means for directing the motion of said fluid, said means forming a moving jet in such direction relative to the adjacent edges of said spaced insulating bodies as to prevent the formation of electrical conducting bridges between such adjacent edges.

12. In a system of electric insulation, the combination in an insulator of a plurality of insulating hoods, said hoods being spaced apart, a pre-determined number of said hoods having heat insulating means arranged thereon, an insulating fluid located in the space between said hoods, and means for causing the circulation of said insulating fluid between said insulating hoods.

13. In a system of electric insulation, an insulator body having a plurality of superimposed insulating hood members and having downwardly depending annular baffle members arranged thereon, annular recesses in said hoods, a dense insulating fluid in said recess, said baffle members projecting below the fluid level in said recesses, and means for circulating said insulating fluid in said recesses.

14. In a system for electric insulation, an insulating body, a fluid reservoir arranged therein, fluid-guiding ducts in connection with said pump and reservoir in communication with the outer surfaces of said insulating body, a pump in connection with said reservoir for circulating fluid therefrom to the outer surfaces of said insulating body, and insulating fluid purifying means in connection with said pump.

15. In a system of electric insulation, an insulator comprising a plurality of insulating hollow bodies, a plurality of circulating insulating fluids of different densities, and fluid circulating means for causing said fluids to flow on the surfaces and in the interior of said insulating bodies.

16. In a system of electric insulation, an insulating body comprising a plurality of insulating hollow walls spaced apart, a non-conducting fluid in said hollow walls, said fluid being in contact with the opposite contiguous walls of said hollow members, thereby forming a plurality of sealed intercommunicating compartments, a second insulating fluid of a different density than the first said fluid, and fluid circulating means for causing movement of the second said fluid in the interior of said walls.

17. In a system for electric insulation, an insulator, independent electrical conductors carried thereby, one of said conductors being in the form of a duct in communication with the outer surfaces of said insulator for carrying a circulating insulating fluid to such outer surfaces of said insulator body.

18. In a system of electric insulation, an insulating body, an insulating fluid reservoir therein, fluid pumping and conducting means in connection with said reservoir, and heater means arranged in said insulating body for heating the fluid in said insulating body.

In witness whereof I have hereunto set my hand this 29th day of July, 1909, in the presence of the two subscribing witnesses.

ERWIN MÖLLER.

Witnesses:
LEWIS DEINER,
MARTA L. THOMPSON.